United States Patent
Goker et al.

(10) Patent No.: US 7,684,144 B1
(45) Date of Patent: Mar. 23, 2010

(54) MULTI-RATE TRACKING WITH A MULTI-ACTUATOR SERVO CONTROL

(75) Inventors: Turguy Goker, Solana Beach, CA (US); Ming-Chih Weng, Los Angeles, CA (US); Ryan Taylor, Los Angeles, CA (US); Umang Mehta, Irvine, CA (US)

(73) Assignee: Quantum Corporation, San Jose, CA (US)

( * ) Notice: Subject to any disclaimer, the term of this patent is extended or adjusted under 35 U.S.C. 154(b) by 0 days.

(21) Appl. No.: 12/260,937

(22) Filed: Oct. 29, 2008

(51) Int. Cl.
*G11B 5/584* (2006.01)
*G11B 5/55* (2006.01)
(52) U.S. Cl. .................. 360/77.12; 360/78.02
(58) Field of Classification Search .............. None
See application file for complete search history.

(56) References Cited

U.S. PATENT DOCUMENTS

2003/0016467 A1 * 1/2003 Bui et al. ............ 360/77.12
2006/0245104 A1 * 11/2006 Bui et al. ............... 360/69

* cited by examiner

Primary Examiner—Andrew L Sniezek
(74) Attorney, Agent, or Firm—Baker Botts L.L.P.

(57) ABSTRACT

In a method of multi-rate tracking with a multi-actuator servo control, a track position error is sampled at an asynchronous sample rate for operating a first actuator. The track position error is also sampled at a synchronous sample rate for operating a second actuator. The sampling from the synchronous sample rate is utilized to reduce a delay associated with the sampling at the asynchronous sample rate.

21 Claims, 5 Drawing Sheets

MULTI-RATE TRACKING WITH A MULTI-ACTUATOR SERVO CONTROL

BACKGROUND

In a tape drive, such as a linear tape drive, the tape speed during operation is typically around 2-10 meters per second, with the reels rotating at around 10-70 times per second. Additionally, on a typical half inch tape, there may be 1000 or more data tracks spaced laterally across the tape. Because of these speeds, lateral tape position errors are likely to occur. And because of the density of data tracks, the lateral tape position errors are likely to cause track misregistration.

One type of error is caused by vibration events that are not directly related to the tape drive operation or tape speed. In general, in the low frequency region below 500 Hz, these vibration events could be generated by external vibration to the tape drive, or electric cooling fan vibrations. In the high frequency region greater than 500 Hz, these vibration events could be the resonance of the tape in the lateral direction, or the resonance of the tape guides.

However, there is also a second type of event that can occur with respect to the operation of the tape drive. In many cases, these events are related to the actual operation of the tape drive at higher speeds and can introduce vibration errors or transient tape motions. In general, in the low frequency region below 500 Hz, these events could be generated from rotating frequency of tape guides, or rotating frequency of tape reels. In the high frequency region greater than 500 Hz, these events could be generated by roller bearing defects, reel motor cogging, tape edge wear, reel flanges scraping tape edge, roller surface contamination and stiction to tape surface, or other irregular geometry causing fast transient tape motions. For example, in a single reel tape cartridge drive, the tape drive may utilize grabbers or bucklers to thread the tape from the cartridge to the drive reel. As such, there is an unavoidable grabber or buckler mismatch to the drive reel hub. This sudden protrusion or recession on the reel hubs can cause sudden disturbance to the tape motion longitudinally and/or laterally. The lateral tape motion can be so fast that the head of the tape drive cannot accurately follow and read from or write to the tightly spaced adjacent data tracks.

Presently, tape drives utilize a controller to move an actuator and the read/write head to follow the tape position errors. In this manner the low frequency tape position errors can be successfully eliminated. For example, markings known as Position Error Signals (PES) are provided at fixed intervals along the tape and a controller can sample the PES and output a control demand to the actuator based on a constant sample rate. This results in a set of coefficients that are fixed for a given controller design. However, due to the variation of tape speed in a tape drive, the PES frame rate and controller sample rate may become asynchronous to each other thereby resulting in additional undesirable delays for the controller. In other words, the controller may be reacting to an error scenario, such as a tape location shift, that has changed during the asynchronous delay. Thus, a controller's suppression function may be either too small or too large with respect to the real-time position of the tape.

SUMMARY

This Summary is provided to introduce a selection of concepts in a simplified form that are further described below in the Description of Embodiments. This Summary is not intended to identify key features or essential features of the claims, nor is it intended to be used as an aid in determining the scope of the claims.

In a method of multi-rate tracking with a multi-actuator servo control, a track position error is sampled at an asynchronous sample rate for operating a first actuator. The track position error is also sampled at a synchronous sample rate for operating a second actuator. The sampling from the synchronous sample rate is utilized to reduce a delay associated with the sampling at the asynchronous sample rate.

BRIEF DESCRIPTION OF THE DRAWINGS

The accompanying drawings, which are incorporated in and form a part of this specification, illustrate embodiments of the subject matter and, together with the description, serve to explain principles discussed below.

Figure 1:
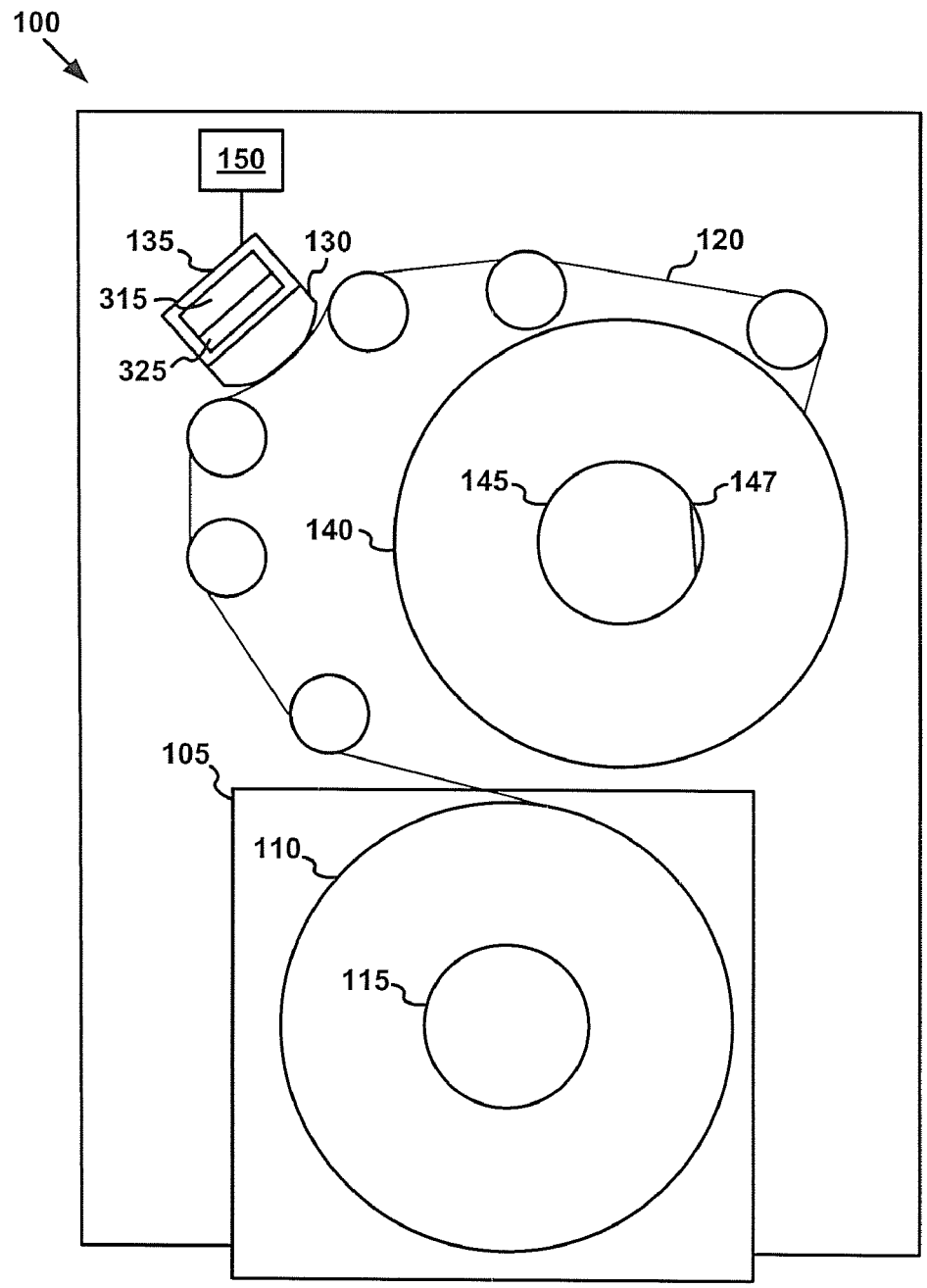
FIG. 1 is a diagram of an example tape drive incorporating an embodiment of the subject matter described herein.

The drawings referred to in this brief description should be understood as not being drawn to scale unless specifically noted.

DESCRIPTION OF EMBODIMENTS

Reference will now be made in detail to various embodiments of the subject matter, examples of which are illustrated in the accompanying drawings. While description of various embodiments will be made herein, it will be understood that they are not intended to limit to these embodiments of the subject matter. On the contrary, the presented embodiments are intended to cover alternatives, modifications and equivalents, which may be included within the spirit and scope of the various embodiments as defined by the appended claims. Furthermore, in the following description of embodiments, numerous specific details are set forth in order to provide a thorough understanding of embodiments of the subject matter. However, embodiments may be practiced without these specific details. In other instances, well known methods, procedures, components, and circuits have not been described in detail as not to unnecessarily obscure aspects of the described embodiments.

Notation and Nomenclature

Unless specifically stated otherwise as apparent from the following discussions, it is appreciated that throughout the description of embodiments, discussions utilizing terms such as "sampling," "utilizing," "receiving," "generating," "operating," "performing," "correcting," "filtering," "reducing," "processing," "sampling," or the like, refer to the actions and processes of a computer system, integrated circuit, microcontroller, processor, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. In some embodiments, as described herein, a processor and/or electronic computing device resides within and/or is coupled with a tape drive. In some embodiments the electronic computing device comprises an Application Specific Integrated Circuit. In some embodiments the electronic computing device comprises a digital filter and/or control system, analog filter and/or control system, or hybrid analog-digital filter and/or control system.

Overview of Discussion

In a tape drive, a tape is transported from a supply reel (referred to herein as a cartridge reel) to a take up reel (referred to herein as a drive reel). Between these reels the tape is guided by tape guides and wrapped on a read/write head for recording and playback. In an operating linear tape drive, for example, the tape speed may be fixed or variable and may be on the order of 2-10 meters/second. In order to prevent and reduce errors in reading and writing, it is useful to control and minimize any lateral position error between the location of the read/write head and the data track on the tape.

Embodiments of the present technology utilize a tape head position compensation filter comprising: an asynchronous sample rate and coarse compensation filter for controlling a coarse actuator; and a synchronous sample rate and fine compensation filter for controlling a fine actuator. As described further below, the outputs of the coarse and fine actuators are summed with one another (such as mechanically in a multi-actuator coupled with a head in the tape drive). In this manner, the actuation output of the coarse and fine actuators are summed to provide a corrected lateral position of the head with respect to a tape. This provides for asynchronous coarse control of the lateral position of a tape head (at a low frequency) and synchronous fine control of the lateral position of the tape head (at a higher frequency). This multi-servo control allows for higher bandwidth suppression of disturbances in general, and allows for effective suppression of tape speed synchronous disturbances.

The present discussion will begin with a description of an example tape drive with which, or upon which, embodiments described herein may operate. The discussion will proceed to a description of an example PES tape format utilized in conjunction with embodiments. Components of a tape head position compensation module and filter will then be described. Operation of the example compensation module and filter will then be described in more detail in conjunction with a description of an example method of multi-rate tracking with a multi-actuator servo control.

Example Tape Drive

FIG. 1 is a diagram of an example tape drive 100 incorporating an embodiment of the subject matter described herein. Tape drive 100 represents a generic tape drive, and is shown by way of example and not of limitation. It is appreciated that embodiments described herein are not limited to use with/ within tape drive 100, but instead are operable with/within a variety of tape drives. Tape drive 100 is shown with a tape cartridge 105 inserted into tape drive 100. Tape cartridge 105 is removable from tape drive 100, and includes a cartridge reel 110 with a cartridge reel hub 115. Tape 120 is spooled about cartridge reel hub 115 of cartridge reel 110. Tape cartridge 105 supplies tape 120 to tape drive 100. Tape drive 100 includes a drive reel 140 which takes up tape 120 from tape cartridge 105 (when inserted).

A portion of tape 120 (such as a leader) is coupled to drive reel hub 145 by means of a fastening device 147, such as, for example, a grabber or buckler. Fastening device 147 engages tape 120 and then integrates or blends with drive reel hub 145, thereby coupling tape 120 to drive reel hub 145.

During operation of tape drive 100 and drive reel 140, tape 120 is spooled between drive reel 140 and cartridge reel 110 and in the process is guided longitudinally across a head 130. Head 130 operates to read data from or write data to tape 120 as tape 120 travels longitudinally in proximity to head 130 while being spooled between drive reel 140 and cartridge reel 110. In general, head 130 may include at least one read element and at least one write element for reading and/or writing data. Moreover, in one embodiment, head 130 may also include at least one servo read element for reading servo information recorded on the magnetic tape.

In one embodiment, head 130 is supported by a compound servo actuator 135. Compound servo actuator 135 utilizes multiple servos to position head 130 laterally with respect to the magnetic tape, to move head 130 between tracks on tape 120, and to follow desired tracks recorded longitudinally along tape 120. In one embodiment, compound servo actuator 135 comprises two actuators: a coarse actuator 137; and a fine actuator 139. In one embodiment, coarse actuator 137 comprises a voice coil motor (VCM) with approximately 200 μm moving range while fine actuator 139 comprises a micro voice coil motor with approximately 10 μm moving range. Further, in one embodiment, the fine actuator 139 is mechanically mounted on/coupled with the moving portion of coarse actuator 137.

A tape head position compensation filter 150 supplies positioning commands to compound servo actuator 135. Tape head position compensation filter 150 utilizes an asynchronous sample rate and a coarse compensation filter 310 (FIG. 3) for controlling coarse actuator 137. Tape head position compensation filter 150 utilizes a synchronous sample rate and a fine compensation filter 320 (FIG. 3) for controlling fine actuator 139. As will be further described herein, tape head position compensation filter 150 utilizes the low bandwidth coarse compensation filter 310 to deal with low frequency disturbances. Due to the low bandwidth (e.g., 100-500 Hz), coarse compensation filter 310 is not adversely affected by phase loss due to asynchronous sampling. Concurrently, tape head position compensation filter 150 utilizes the high bandwidth fine compensation filter 320, which operates in synchronization with the actual PES frame rate (which varies with changes in tape speed). Due the high bandwidth (e.g., >500 Hz) and operation in synchronization with the PES frame rate, fine compensation filter 320 does not suffer from phase loss due to asynchronous sampling of tape position information, as its sampling is synchronized with the PES read from a moving tape 120. Therefore, tape head position compensation filter 150 is more optimized in its response (as compared to conventional techniques which operate at a single sample rate) since the high frequency portion is executed at the PES frame rate, while, the low frequency portion is executed at a fixed rate since its characteristics are less dependent on phase loss.

In one embodiment, the outputs of the coarse and fine actuators are summed with one another, such as, for example, mechanically in compound servo actuator 135 which is coupled with a head 130. In this manner, the actuation output of coarse actuator 137 and fine actuator 139 are summed within compound servo actuator 135 to provide a corrected lateral position of head 130 with respect to tape 120. This results in a multi-rate servo system in which the tape head position compensation filter 150 reduces the time delays that would be caused by a conventional compensation filter running only asynchronous to the PES frame rate and trying to deal with the entire frequency spectrum of tape motion disturbance. This time delay improvement allows the tape drive 100 to achieve higher loop bandwidths and lower suppression function amplification of unwanted frequency zones.

Figure 2:
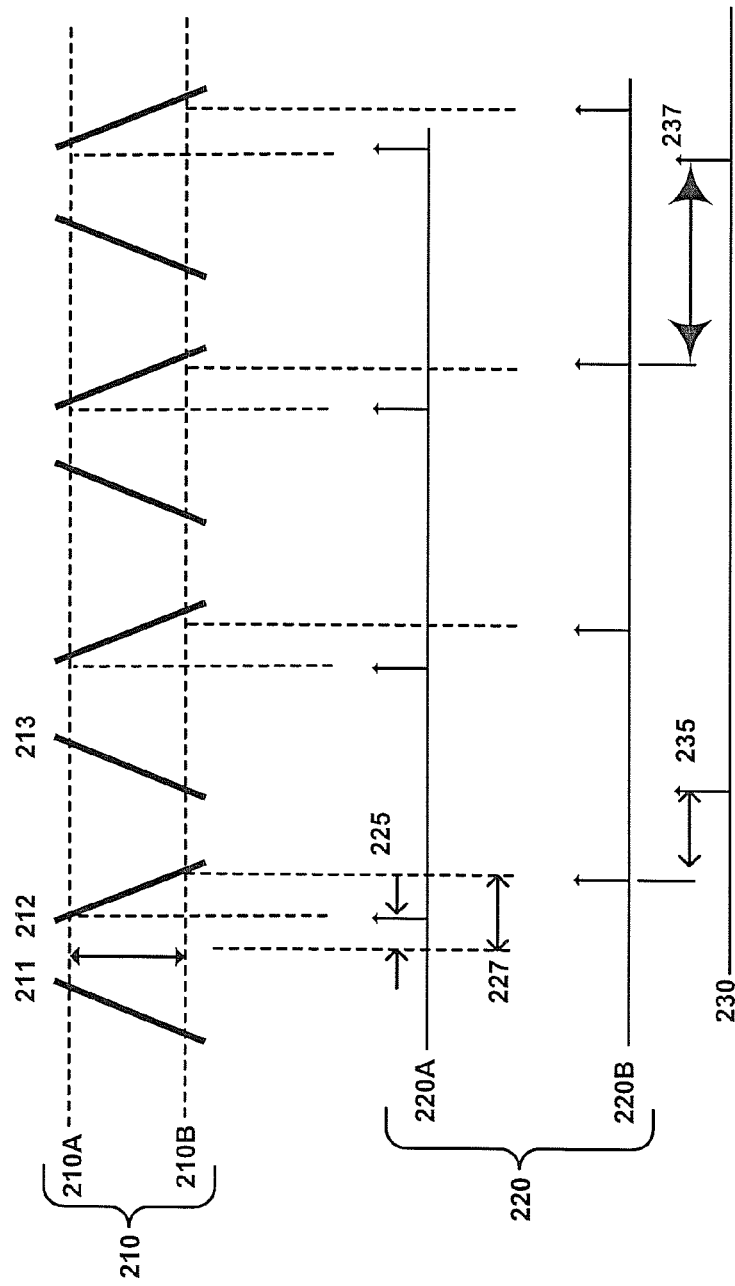
FIG. 2 shows a graphical diagram of timing information within a servo band, according to an embodiment.

With reference now to FIG. 2, a graphical diagram 200 of a compensator utilizing timing information within a servo band; such as, for example, PES formatting; is shown in accordance with one embodiment of the present technology. In general, graphical diagram 200 includes a timing diagram 210 of the PES format, a format delay 220 and an asynchronous delay 230 existing for two exemplary top and bottom track locations 210A and 210B of the timing diagram 210.

With respect to format delay 220, the associated lines 220A and 220B show the timing feedback and PES top 225 and the bottom 227 delays associated with the azimuth angles of 211 and 212 of timing diagram 210. The delays at both top 225 and bottom 227 are inherent to the timing 210 and they are tape speed related. In other words, the faster the tape speed the smaller the delays. The format delay 220 will not be addressed by embodiments of this invention.

With respect to asynchronous delay 230, it shows the micro processor interrupt signals based on fixed time period and the associated delay 235 and 237. The two consecutive delays 235 and 237 are due to micro processor sampling rate being asynchronous to the PES frame rate, and are varying consecutively. For example, if PES frames are occurring every 100 μm, that is, the distance between servo stripe 211 and servo stripe 213 is 100 μm, the delay 230 will vary consecutively within the range of 0 to 100 μm. The asynchronous delay 230 will be addressed by embodiments described herein.

Figure 3:
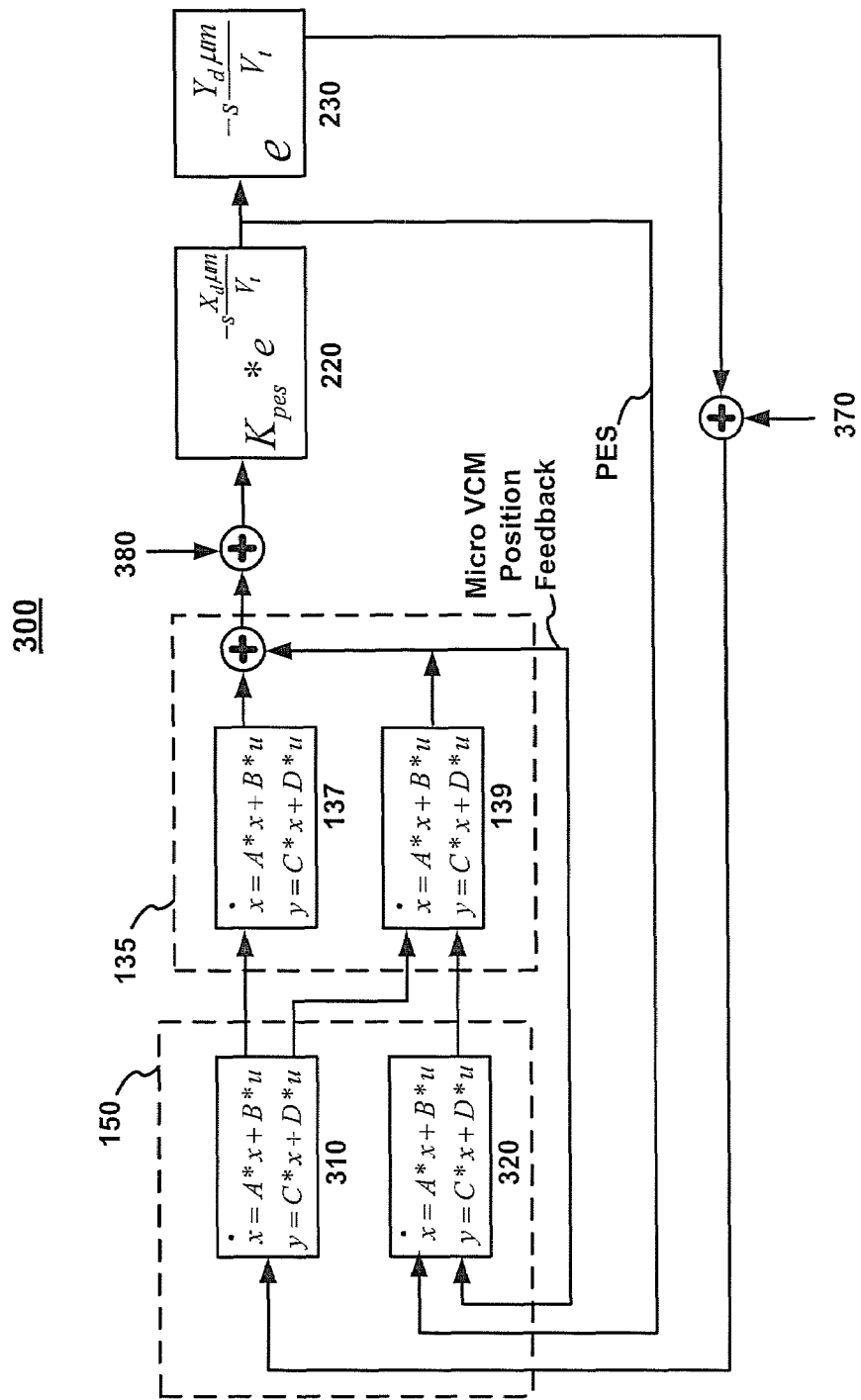
FIG. 3 shows a block diagram of a feedback control system in the form of a compensation module, according to an embodiment.

With reference now to FIG. 3, a block diagram of a feedback control system in the form of compensation module 300 is shown in accordance with one embodiment of the present technology. In one embodiment, compensation module 300 includes coarse compensation filter 310 and fine compensation filter 320, coarse actuator 137, and fine actuator 139, and a sample and hold delay (e.g., a register, buffer, or the like). Compensation module 300 receives or accesses a lateral tape motion (LTM) disturbance 380 as an input and receives or accesses a lateral target position 370 (with respect to tape 120) as an input. Compensation module 300 receives, accesses, samples, or otherwise determines a servo format delay 220 position error signal which is provided synchronously with reading of PES from tape 120, as an input to fine compensation filter 320. Compensation module 300 also receives, accesses, samples, or otherwise determines an asynchronous time delay 230 position error signal. Asynchronous delay 230 models a PES signal buffered by sample and hold and supplied as an input to coarse compensation filter 310 in response to a generated interrupt. The generated interrupt typically occurs on a repetitive time schedule such as, for example, every N microseconds (e.g., every 50 μs) or after a certain number of microprocessor clock cycles. As such the generated interrupt drive sampling is almost always asynchronous with the PES frame rate read from tape 120.

The servo format delay 220 is represented by Equation 1:

$$K_{pes} * e^{-s\frac{X_d \mu m}{V_t}} \qquad \text{Equation 1}$$

where:

$K_{pes}$ is servo format gain with unit of PES-ratio/μm;

s is Laplace operator;

$V_t$ is tape speed in μm/s; and $X_d$ is the format delay in μm, and is shown in FIG. 2 as delay 225 and delay 227.

The asynchronous delay 230 is represented by equation 2:

$$e^{-s\frac{Y_d \mu m}{V_t}} \qquad \text{Equation 2}$$

where:

s is Laplace operator;

$V_t$ is tape speed in μm/s; and $Y_d$ is the asynchronous delay in μm, and is shown in FIG. 2 as delay 235 and delay 237.

Coarse compensation filter 310, fine compensation filter 320, coarse actuator 137, and fine actuator 139 are shown modeled in a standard state-space format, with example Z-Transforms (Laplace transforms) notation for digital control/filter implementation based upon the depicted inputs and outputs. Such Z-Transform notation, to express the operation of filters and/or other circuit elements in state-space format, is well understood by those skilled in the art of electronic filter and control theory and application. As shown, Equation 3 and Equation 4 represent a state-space expression for a digitally modeling coarse compensation filter 310, fine compensation filter 320, coarse actuator 137, and fine actuator 139:

$$\dot{x}=A*x+B*u \qquad \text{Equation 3}$$

$$y=C*x+D*u \qquad \text{Equation 4}$$

where:

$\dot{x}$ represents the derivative of the state of the filter or actuator;

x represents the current state of the filter or actuator;

u represents the input to the filter or actuator;

y represents the output of the filter or actuator;

A is a system matrix, and relates how the current state affects the state change;

B is a control matrix, and determines how the system input affects the state change;

C is an output matrix, and determines the relationship between the system state and the system output; and D is a feed-forward matrix, and allows for the system input to affect the system output directly.

In one embodiment, tape head position compensation filter 150 receives low frequency information in the form of asynchronous time delay 230 from asynchronous sampling operations and receives high frequency information in the form of synchronous format delay 220 from synchronous sampling operations. In one embodiment, tape head position compensation filter 150 processes and uses the low frequency information and the high frequency information to generate commands to multiple actuators of a multi-stage actuator, such as compound servo actuator 135, for laterally positioning head 130 with respect to target position 370 on said tape 120 in tape drive 100.

In one embodiment of tape head position compensation filter 150, coarse compensation filter 310 receives a summation of a target position 370 and an asynchronously sampled PES signal as an input. Coarse compensation filter 310 generates low frequency (e.g., below ~500 Hz) correction commands associated with this asynchronous sampling operation. Coarse compensation filter 310 acts as a low bandwidth controller and provides a low frequency positioning command or commands, as an output, to coarse actuator 137. In one embodiment, the positioning commands are also provided as a reference to fine actuator 139.

Coarse actuator 137 performs macro or coarse adjustments of tape head 130 to maintain target position 370, based on these commands which have been generated utilizing asynchronous sampling and filtering. These commands constitute low frequency correction information which controls coarse actuator 137 to reduce and/or suppress low frequency events. This low frequency correction information is directly related to compensating for, correcting, reducing, and/or suppressing one or more tape drive events including, but not limited to: external vibration, fan vibration, reel runout, and roller runout.

In one embodiment of tape head position compensation filter 150, fine compensation filter 320 receives a synchronously sampled PES as an input and also receives feedback of the position of fine actuator 139 (e.g., Micro VCM Position Feedback) as an input. Fine compensation filter 320 generates high frequency (e.g., >500 Hz in one embodiment) correction commands associated with this synchronous sampling operation. Fine compensation filter 320 acts as a high bandwidth controller and provides a high frequency positioning command or commands, as an output, to fine actuator 139.

Fine actuator 139 performs micro or fine adjustments to maintain target position 370, based on these commands which have generated utilizing synchronous sampling and filtering with respect to a speed of tape 120. The fine adjustments are typically smaller lateral adjustments than the above described coarse adjustments. These commands constitute high frequency correction information which controls fine actuator 139 to reduce high frequency events and asynchronous delay associated with the asynchronous operation of coarse actuator 137. This high frequency correction information is directly related to compensating or correcting for high frequency events which can include, but are not limited to: an internal component vibration, and lateral tape motion disturbances. This high frequency correction information is also directly related to compensating or correcting for one or more tape speed synchronous events which can include, but are not limited to: an internal component motion, and an internal component harmonic.

As shown, the outputs of coarse actuator 137 and fine actuator 139 are summed with one another and with LTM disturbance 380. Such summing is accomplished in one embodiment, by mechanically coupling coarse actuator 137 with fine actuator 139, as has been previously described, to laterally position tape head 130 with respect to tape 120. In this manner coarse actuator 137 performs a coarse lateral correction of a position of head 130 with respect to a target position (e.g. target position 370) and said fine actuator 139 performs a fine lateral correction of the position of head 130 with respect to the target position. This allows large corrections to be made at low speed and fine corrections to be made at high speed.

In some embodiments, additional component(s) such as a processor, microcontroller, application specific integrated controller and/or data storage features (e.g., read only memory (ROM) and/or random access memory (RAM)) is/are included in or used to implement functions of compensation module 300 described herein, however, these and other components are not described in detail herein so as not to obscure aspects of the embodiments being described. It is appreciated that, in some instances, all or portions of some embodiments of compensation module 300 described herein are composed of computer-readable and computer-executable instructions that reside, for example, in computer-usable/computer-readable media such as a memory or firmware of tape head position compensation filter 150, or a RAM or ROM associated with a microprocessor or microcontroller. Moreover, it is appreciated that in some embodiments, all or part of tape head position compensation filter 150 is implemented: with digital components (e.g., by a microprocessor, microcontroller, or ASIC); with analog components (e.g., with operational amplifiers); or with a mix of digital and analog components (e.g., with coarse compensation filter 310 implemented with digital components and fine compensation filter 320 implemented with all or some analog components).

Example Methods of Operation

Figure 4:
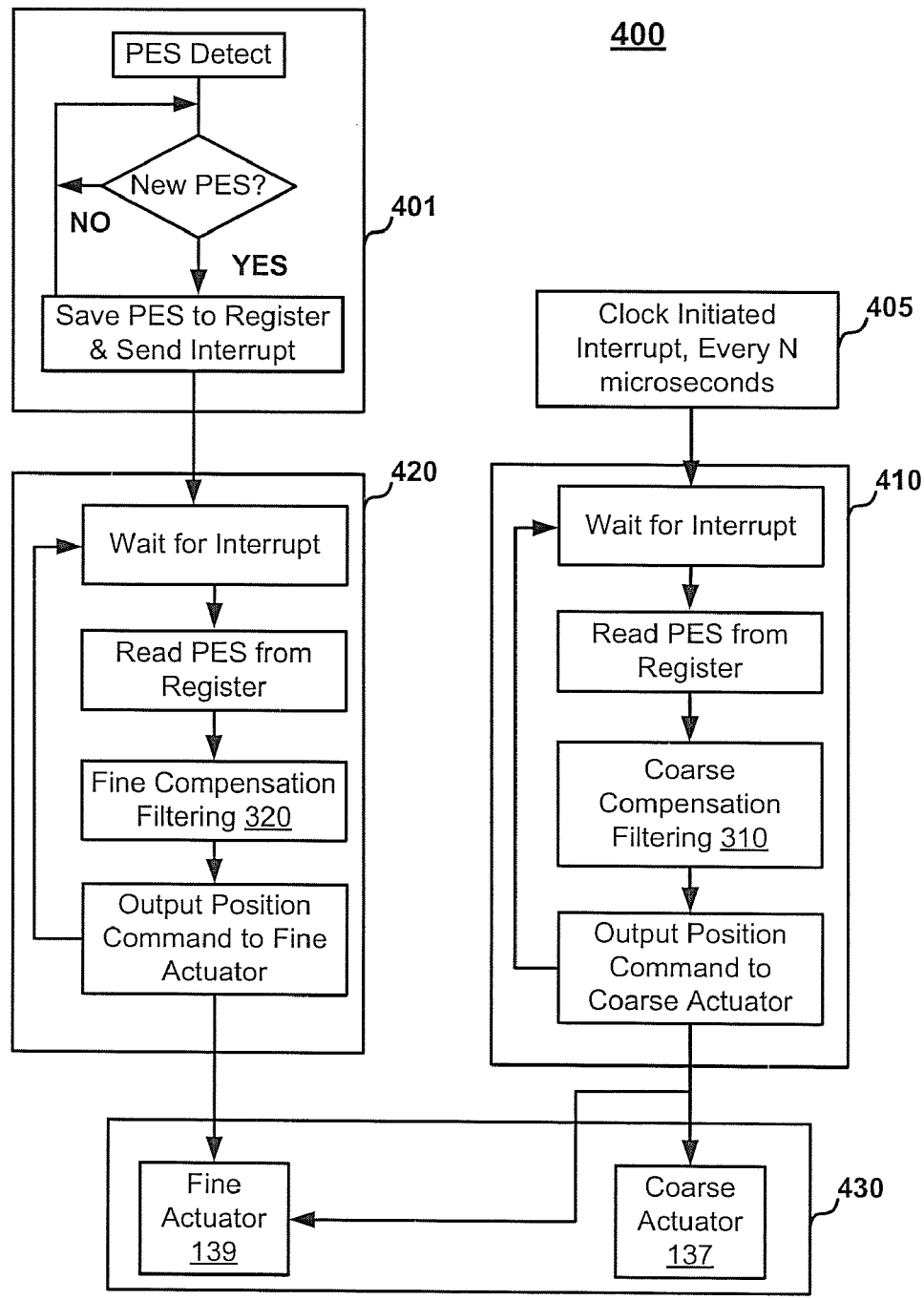
FIG. 4 shows a flow diagram of a method for multi-rate tracking with a multi-actuator servo, according to an embodiment.
Figure 5A:
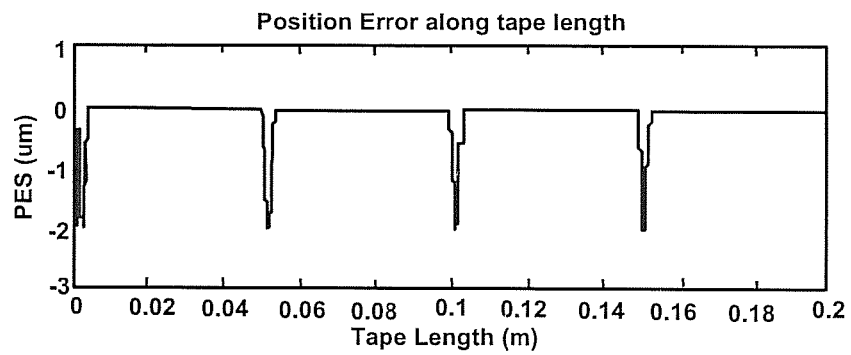
FIGS. 5A, 5B, 5C, and 5D show a plurality of graphs illustrating the differences in the frequency spectrum of asynchronous sampling and synchronous sampling on a tape speed related position error.
Figure 5B:
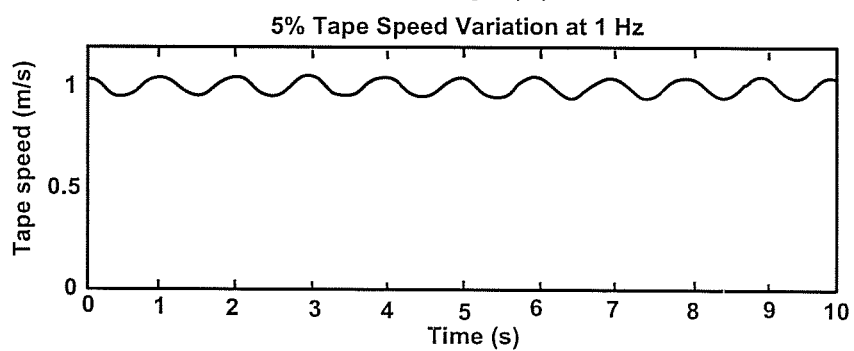
Figure 5C:
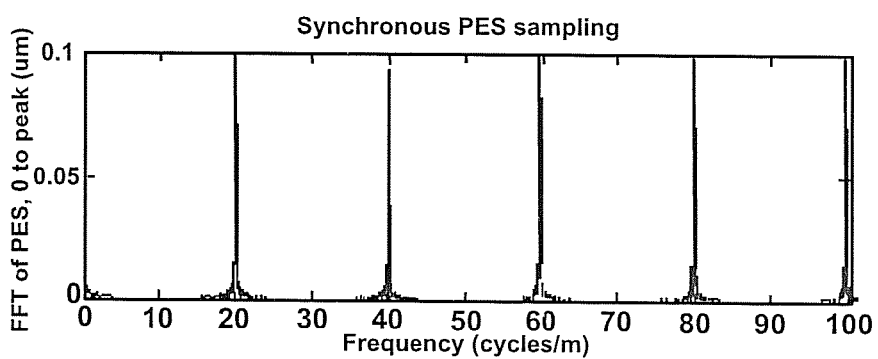
Figure 5D:
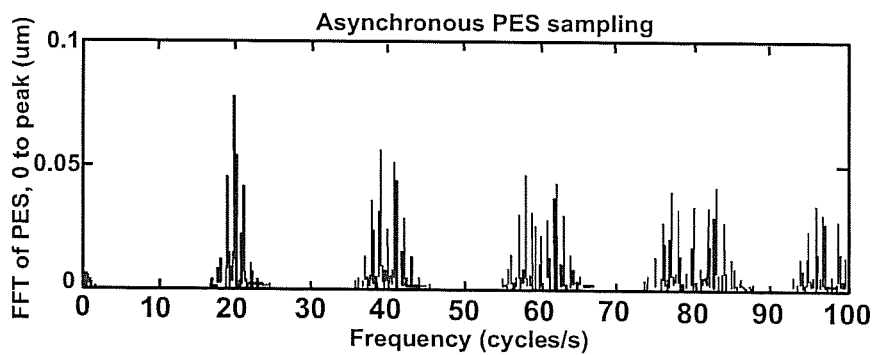

The following discussion sets forth in detail the operation of some example embodiments. With reference to FIG. 4, flow diagram 400 illustrates example procedures used by various embodiments. Flow diagram 400 includes processes that, in various embodiments, are carried out by a processor under the control of computer-readable and computer-executable instructions. The computer-readable and computer-executable instructions for executing the method illustrated by flow diagram 400 reside, for example, in any tangible computer-readable media, such as data storage features internal or external to tape drive 100. For example, in one embodiment the computer-readable and computer-executable instructions, reside on computer-readable media such as a ROM or firmware of a microcontroller which, is/are used to perform the functions of, or operate in conjunction with, for example, portions of compensation module 300 of FIG. 3. In another example, such computer-readable and computer-executable instructions may reside on a computer-readable storage media such as a diskette (e.g., a Compact Disc Read Only Memory (CD-ROM)) which is used to control operation of a processor in a computer system coupled with tape drive 100. Although a specific flow of procedures is disclosed in flow diagram 400, such a flow is provided for example. That is, embodiments are well suited to performing various other procedures or variations of the procedures recited in flow diagram 400. It is appreciated that the procedures in flow diagram 400 may be performed in an order different than presented, and that not all of the procedures in flow diagram 400 may be performed in every embodiment.

FIG. 4 shows a flow diagram 400 of an example method of multi-rate tracking with multi-actuator servo control. For example, utilizing the dual actuators and associated compensation filters as described herein reduces read/write errors that may occur due to lateral position error between the data track on a tape and read/write head. Specifically, as described herein an asynchronous sample rate is utilized at a coarse actuator and a second synchronous sample rate at a fine actuator. This results in a multi rate servo system. Reference will be made to elements of FIGS. 1, 2, and 3 in the description of FIG. 4.

With reference to 401 of FIG. 4, one embodiment detects a PES on a spooling tape. If this is a new PES, it is stored in a register in one embodiment. An interrupt is generated based on the occurrence of the new PES. Upon request, the new PES is supplied directly (or from the register).

With reference to 405 of FIG. 4, one embodiment generates a recurring interrupt signal every N microseconds. The recurring interrupt can be generated based on a clock, timing circuit, or passing of a number of computing cycles in a microprocessor or microcontroller. For example, in one embodiment, the interrupt is generated every 50 μs by a microprocessor which is implementing digital filtering and control associated with compensation module 300. The recurring interrupt signal is a signal to sample for PES. As tape speed varies in a tape drive, but the recurring interrupt signal does not, this sampling of PES in response to the generated interrupt signal generally results in a sampling which is asynchronous to tape speed of tape 120.

With reference to 410 of FIG. 4 and to FIG. 3, one embodiment samples the track position error at an asynchronous sample rate for operating a first actuator. For example, the tape drive servo head detects timing 210 on tape 120 as tape 120 moves across head 130. That is, as described herein, the tape drive electronics detects PES and output PES samples such as 220A or 220B when detecting timing 210. The inherent top delay 225 or bottom delay 227 are also generated. Furthermore, the firmware of the tape drive waits for a generated interrupt signal, generated at 405, at a constant rate to pick up the latest PES value from storage in a register. Due to the asynchronous nature of the sampling, procedure 410 has an unwanted asynchronous delay associated with timing delay 230. In other words, the PES pulses 220A and 220B are dependent on the speed of the tape while the PES sampling pulses 230 are based on a specific sample rate. As such, it is apparent that the two timing events are completely independent in operation and are truly asynchronous to one another in nearly all instances.

In general, coarse compensation filter 310 utilizes a fixed sample rate for the generated interrupt associated with sampling time delay 230 because it allows the user to fix the low frequency response of tape head position compensation filter 150 for a given sample rate. In a digital implementation this prevents excessive calculations and on the fly variations of the filtering implementation. However, this methodology results in an extra delay due to two different sampling frequencies running at different rates. This extra delay penalizes the phase loss of the tracking loop and is one of the limitations of achieving higher bandwidths.

With respect still to 410 and still to FIG. 3, the tape drive electronics provides the asynchronous input to coarse compensation filter 310. Coarse compensation filter 310 then generates a response that may be, and typically is, asynchronous with the actual tape speed. As shown at FIG. 3, the output from coarse compensation filter 310 is provided to coarse actuator 137. At that time, coarse actuator 137 adjusts the position of the read/write head 130 based on the received input. In one embodiment, actuator positioning signals (e.g., commands) are also provided as a reference position information to fine actuator 139.

With reference now to 420 of FIG. 4 and also FIG. 3, one embodiment samples the track position error at a synchronous sample rate for operating the second actuator. This comprises receiving an interrupt when a new PES is detected in 401, and reading the new PES from storage in a register or receiving the new PES directly as it is detected. Tape head position compensation filter 150 then utilizes this position error signal as an input to fine compensation filter 320 which generates and outputs commands for high frequency adjustment of lateral tape head position via fine actuator 139.

In other words, to deal with any high frequency vibrations, for example, such as tape speed changes and any vibrations from components of the tape drive or motions of the tape itself associated therewith, a second portion (e.g., fine compensation filter 320) of tape head position compensation filter 150 is utilized to address these disturbances. Furthermore, for tape speed related disturbances that will be synchronous to the PES frame rate, output of fine compensation filter 320 will be also synchronous to these disturbances.

With reference now to FIG. 5, a plurality of graphs showing examples of speed related disturbances and their detection by asynchronous sampling and synchronous sampling are shown. FIG. 5A shows a Lateral Position Error of 2 um pulses occurring periodically every 50 mm along the tape length. FIG. 5B shows the tape speed at 1 m/s with 5% ripples at 1 Hz frequency. FIG. 5C shows the frequency spectrum of detected Lateral Position Error while using synchronous PES sampling, and the sharp peaks at 20 cycles/m and its harmonics are clearly shown. FIG. 5D shows the frequency spectrum of detected Lateral Position Error while using asynchronous PES sampling, and the sharp peaks are now smeared broadly due to the asynchronous sampling.

Referring now to 430 of FIG. 4 and also to FIG. 3, one embodiment utilizes the sampling from the synchronous sample rate to reduce the delay associated with the sampling at the asynchronous sample rate. For example, in one embodiment, the output from both coarse compensation filter 310 and fine compensation filter 320 are provided to fine actuator 139. As shown in FIG. 3 and at 430, coarse actuator 137 is commanded to make low frequency macro adjustments to the lateral position of tape head 120 while fine actuator 139 provides additional high frequency micro fine adjustment to the position of the read/write head 130 based on the received input. As such, the dual compensation information of tape head position compensation filter 150 significantly reduces or even eliminates the delays due to asynchronous sampling of the coarse compensation filter 310.

Moreover, by utilizing the dual inputs, tape head position compensation filter 150 additionally allows the tape drive 100 to be utilized at higher bandwidths than previously possible due to the elimination of unwanted delays and phase loss that previously resulted from unaccounted for time delay from asynchronous PES sampling, when only asynchronous sampling is used. In addition, when high frequency fine compensation filter 320 operates synchronously to the tape speed of tape 120 by using the PES frame rate as the time base, the resulting suppression function dynamically follows the disturbances that are tape speed related.

Also in variable speed applications where the tape speed dynamically changes over a wide range, the synchronous sampling can follow lateral tape motion (LTM) disturbances that are a function of tape speed such as roller fundamental and harmonics.

Example embodiments of the subject matter are thus described. Although embodiments of the subject matter have been described in a language specific to structural features and/or methodological acts, it is to be understood that the embodiments of the subject matter defined in the appended claims is not necessarily limited to the specific features or acts described above. Rather, the specific features and acts described above are disclosed as example forms of implementing the claims.

What is claimed is:

1. A method of multi-rate tracking with multi-actuator servo control, said method comprising:
  sampling a track position error at an asynchronous sample rate for operating a first actuator;
  sampling said track position error at a synchronous sample rate for operating a second actuator; and utilizing said sampling from said synchronous sample rate to reduce a delay associated with said sampling at said asynchronous sample rate.

2. The method of claim 1, further comprising:
utilizing a coarse actuator as said first actuator.

3. The method of claim 2, further comprising:
utilizing said asynchronous sample rate for operating said coarse actuator with a low bandwidth controller.

4. The method of claim 1, further comprising:
utilizing a fine actuator as said second actuator.

5. The method of claim 4, further comprising:
utilizing said synchronous sample rate for operating said fine actuator with a high bandwidth controller.

6. The method of claim 1, further comprising:
utilizing said asynchronous sample rate to reduce track position errors due to external vibration, fan vibration, reel hub runout, or roller runout.

7. The method of claim 1, further comprising:
utilizing said synchronous sample to reduce high frequency disturbances and also to reduce tape speed related disturbances.

8. A computer-readable medium having computer-executable instructions for performing a method of reducing asynchronous delay in a compensation filter of a tape drive, said method comprising:
receiving low frequency correction information for operating a first actuator and a second actuator asynchronously with respect to a tape speed;
receiving high frequency correction information for operating a second actuator synchronously with respect to said tape speed; and
utilizing said high frequency correction information to generate a correction function for reducing a delay associated with said asynchronous operation of said second actuator.

9. The computer-readable medium of claim 8, further comprising:
utilizing a low bandwidth controller for operating said first actuator.

10. The computer-readable medium of claim 8, further comprising:
utilizing a fine actuator as said second actuator.

11. The computer-readable medium of claim 10, further comprising:
utilizing said synchronous sample rate for operating said fine actuator with a high bandwidth controller.

12. The computer-readable medium of claim 8, further comprising:
utilizing said low frequency correction information to generate a suppression function to reduce low frequency disturbances and to reduce disturbances which are asynchronous to tape speed.

13. The computer-readable medium of claim 12, wherein said low frequency correction information is directly related to at least one tape drive event selected from the group consisting of: external vibration, fan vibration, reel runout, and roller runout.

14. The computer-readable medium of claim 8, further comprising:
utilizing said high frequency correction information to reduce high frequency disturbances and to reduce tape drive operation induced disturbances which are synchronously related to tape speed.

15. The computer-readable medium of claim 14, wherein said high frequency correction information is related to a high frequency event selected from the group consisting of: an internal component vibration, and lateral tape motion disturbances.

16. A tape drive comprising:
a head;
a drive reel configured for engaging a tape and, during operation, rotatably spooling said tape such that said tape passes longitudinally in proximity to said head; a first actuator associated with said head, said first actuator utilizing a sampling operation asynchronously with respect to a speed of said rotatable spooling of said tape;
a second actuator associated with said head, said second actuator utilizing a sampling operation synchronously with respect to said speed of said rotatable spooling of said tape; and
a tape head position compensation filter for receiving low frequency information from said asynchronous sampling operation and high frequency information from said synchronous sampling operation and utilizing said low frequency information and said high frequency information to generate commands to said first actuator and said second actuator for laterally positioning said head with respect to a target position on said tape in said tape drive.

17. The tape drive of claim 16, wherein said tape head position compensation filter further comprises:
a coarse compensation filter configured to generate low frequency correction commands associated with said asynchronous sampling operation, said low frequency correction commands for controlling said first actuator to suppress low frequency events.

18. The tape drive of claim 17, wherein said low frequency correction information is directly related to at least one tape drive event selected from the group consisting of: external vibration, fan vibration, reel runout, and roller runout.

19. The tape drive of claim 16, wherein said tape head position compensation filter further comprises:
a fine compensation filter configured to generate high frequency correction commands associated with said synchronous sampling operation, said high frequency correction commands for controlling said second actuator to reduce high frequency events and high frequency delay associated with said asynchronous operation.

20. The tape drive of claim 19, wherein said high frequency correction information is related to a high frequency event selected from the group consisting of: an internal component vibration, and lateral tape motion disturbances.

21. The tape drive of claim 16, wherein said first actuator and said second actuator are mechanically coupled with one another such that said first actuator performs a coarse lateral correction of a position of said head with respect to said target position and said second actuator performs a fine lateral correction of said position of said head with respect to said target position.

* * * * *